C. ROBERT.
FLY TRAP.
APPLICATION FILED SEPT. 8, 1908.

No. 906,935.

Patented Dec. 15, 1908.

Witnesses
Jos. F. Collins
J. L. Mitchell

Inventor
C. Robert,
By Beeler & Robb
Attorneys

UNITED STATES PATENT OFFICE.

CHARLES ROBERT, OF HOLCOMBE, WISCONSIN.

FLY-TRAP.

No. 906,935.  Specification of Letters Patent.  Patented Dec. 15, 1908.

Application filed September 8, 1908. Serial No. 452,034.

*To all whom it may concern:*

Be it known that I, CHARLES ROBERT, a citizen of the United States, residing at Holcombe, in the county of Chippewa and State of Wisconsin, have invented certain new and useful Improvements in Fly-Traps, of which the following is a specification.

The object of this invention is to provide a simple contrivance adapted to be readily supported upon a window frame and so constructed as to form a trap for insects such as flies.

The invention involves advantageous features of construction in this type of devices, the desirability of which will appear more fully hereinafter.

For a full understanding of the invention, reference is to be had to the following detail description and the accompanying drawings, in which—

Figure 1:
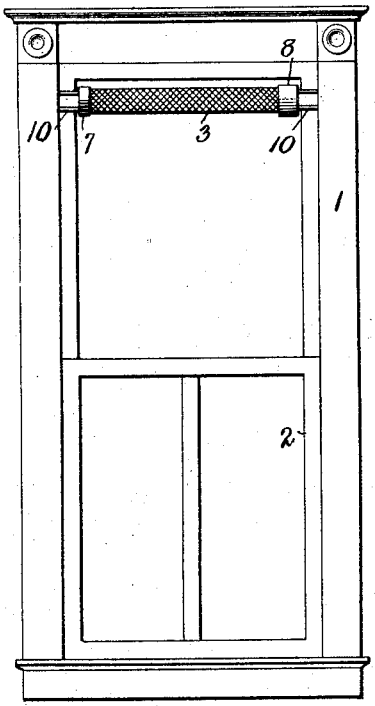
Figure 2:
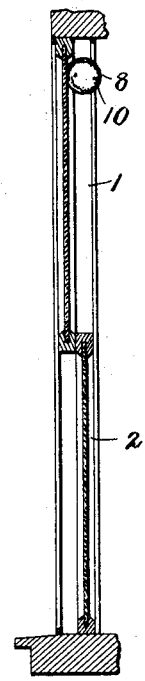
Figure 3:
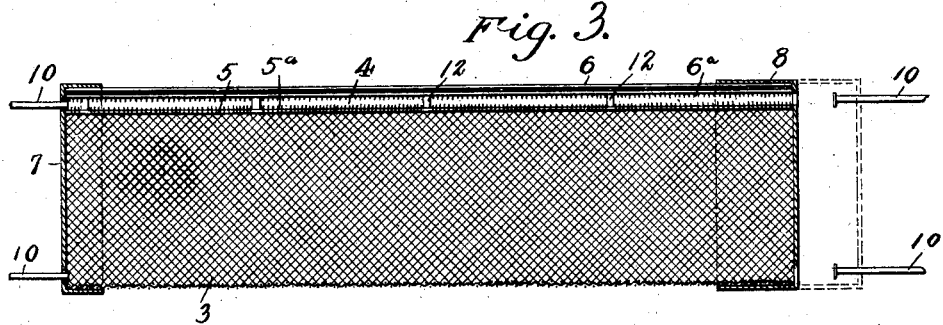
Figure 4:
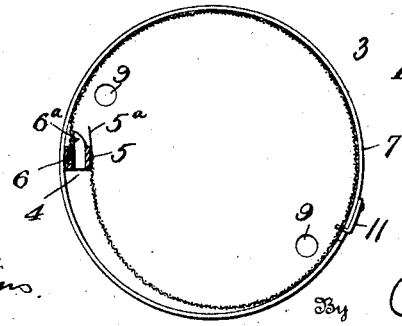

Figure 1 is a front elevation of a window showing a trap embodying the invention in operative position; Fig. 2 is a vertical sectional view showing the device arranged as in Fig. 1; Fig. 3 is a longitudinal sectional view through the trap the slidable end piece being shown in full lines in the position thereof before placing the trap on the window, and in dotted lines in the position assumed when the trap is operative for the purposes of the invention, and Fig. 4 is a transverse sectional view of the device.

Throughout the following detail description and on the several figures of the drawings, similar parts are referred to by like reference characters.

The invention is very simple in form so that it can be manufactured cheaply and will therefore meet with a large demand. Specifically describing the invention and referring particularly to the drawings the numeral 1 designates the window frame in which are mounted the usual sashes 2. The device comprising the invention is preferably arranged at the upper portion of the window frame 1 transversely thereof and is detachable when mounted in operative position. As is well known it is common for flies to crawl upwardly upon the pane of a window sash and having in mind the above the trap comprising the invention is constructed peculiarly. The trap comprises a body 3 preferably of somewhat horizontal form and made preferably of fine mesh wire screen, or similar material. The body 3 is so formed that its longitudinal edges overlap and are spaced apart to provide an entrance or mouth for the trap as shown at 4. The longitudinal edges of the trap body 3 are reinforced by metal strips 5 and 6, the strip 5 being secured to the inner edge of the screen body 3 while the strip 6 is of U-form and applied to the outer edge of said body. The inner edge of the screen body 3 at the entrance 4 is projected beyond the strip 5 in order to provide a number of fine wire fingers or projections 5ª and in like manner the outer edge of the body 3 is folded upon itself by being turned inwardly, the folded portion secured between the sides of the U-shaped strip 6, and the extreme edge of the material projected inwardly by the strip 6 to provide projections or guard fingers 6ª coöperating with the fingers or projections 5ª to prevent flies from escaping from the trap after they have walked into the same through the entrance 4. The projections 6ª curve inwardly toward the projections 5ª. The opposite ends of the body 3 are closed by end pieces or caps 7 and 8, the cap 7 having a short flange receiving an end of the body 2 while the cap 8 has a long flange to receive the adjacent end of the body 3. Both caps 7 and 8 are provided with openings 9 to receive supporting pins 10 applied to the window frame and arranged in spaced relation. The pins 10 may be nails driven into the opposite sides of the frame 1 and in horizontal positions.

In placing the invention in operative position the caps 7 and 8 are applied to the ends of the body 3 in the manner shown in Fig. 3. The trap is then elevated and the pins 10 at one side of the frame 1 engage in the openings 9 of the end piece or cap 7. This having been done the end piece or cap 8 is located adjacent to the pins 10 on the opposite side of the frame 1 but spaced therefrom as shown in Fig. 3. By outward sliding movement of the cap 8, however, the adjacent pins 10 will pass through the openings 9 in said cap and the trap will be supported firmly in a horizontal position and with the entrance 4 thereof close to the pane of the upper sash 2 and in a position permitting flies to readily walk into the trap and be thus caught. Catches 11 are provided on the flanges of the caps 7 and 8 to engage in openings in the screen or reticulated body 3 to hold the caps positively connected with the body when it is arranged in operative position as shown in Fig. 1. To remove the trap in order to empty the same of insects the catch 11 of cap 8 is disengaged from the body 3, said cap moved inwardly away from the pins 10 and thus by disengaging the cap 7 from its pins 10 the device is detached in an evident manner. Vertical spacing members 12 space the longitudinal edges of the body 3.

Having thus described the invention, what is claimed as new, is:

In combination with a window frame, an insect trap comprising a hollow body provided between its ends with an entrance or mouth, supporting members applied to the frame, end caps for the body of the trap engaged with the supporting members aforesaid to hold the trap in operative position, one of said end caps being movable on the body to permit of attachment and detachment of the trap from the frame, and catches for connecting the end caps and body.

In testimony whereof I affix my signature in presence of two witnesses.

CHARLES ROBERT.

Witnesses:
    Geo. Moore,
    Geo. Hall.